US012789919B2

(12) United States Patent
Krishnan et al.

(10) Patent No.: US 12,789,919 B2
(45) Date of Patent: Nov. 10, 2026

(54) TAILGATE SYSTEM AND TAILGATE OPERATING METHOD

(71) Applicant: Ford Global Technologies, LLC, Dearborn, MI (US)

(72) Inventors: Venkatesh Krishnan, Canton, MI (US); Michael Robertson, Jr., West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 649 days.

(21) Appl. No.: 18/306,386

(22) Filed: Apr. 25, 2023

(65) Prior Publication Data

US 2024/0359750 A1 Oct. 31, 2024

(51) Int. Cl.

*B62D 33/027* (2006.01)
*B60R 3/02* (2006.01)
*B62D 33/037* (2006.01)

(52) U.S. Cl.

CPC ............ *B62D 33/0273* (2013.01); *B60R 3/02* (2013.01); *B62D 33/037* (2013.01)

(58) Field of Classification Search

CPC .............. B62D 33/027; B62D 33/0273; B62D 33/03; B62D 33/037; B60J 5/108; E05Y 2900/544; B60R 3/02; B60R 3/007
USPC ............ 296/50, 51, 57.1, 58, 61, 62, 146.12
See application file for complete search history.

(56) References Cited

U.S. PATENT DOCUMENTS

| | | | | | |
|---|---|---|---|---|---|
| 3,785,695 | A * | 1/1974 | Conkle | B62D 33/08 296/50 |
| 5,685,594 | A * | 11/1997 | Harper | B62D 33/0273 296/57.1 |
| 5,816,638 | A * | 10/1998 | Pool, III | B62D 33/0273 296/26.11 |
| 6,890,013 | B2 | 5/2005 | Lacy | |
| 7,699,373 | B2 * | 4/2010 | Miller | B60P 3/40 296/50 |
| 8,109,552 | B2 | 2/2012 | Nelson | |
| 8,740,279 | B1 * | 6/2014 | McGoff | B62D 33/0273 49/168 |
| 9,834,260 | B2 | 12/2017 | Quick et al. | |

(Continued)

FOREIGN PATENT DOCUMENTS

| | | | | | |
|---|---|---|---|---|---|
| DE | 102010052121 | B4 * | 10/2020 | B60J 5/108 |
| EP | 1388447 | A1 * | 2/2004 | E05D 3/127 |
| WO | WO-2015039370 | A1 * | 3/2015 | B60P 1/4492 |

OTHER PUBLICATIONS

Nallet (EP 1388447 A1), machine translation (Year: 2004).*
Liang et al. (WO 2015039370 A1), machine translation (Year: 2015).*

(Continued)

*Primary Examiner* — Wenwei Zhuo
(74) *Attorney, Agent, or Firm* — Vichit Chea; Carlson, Gaskey & Olds, P.C.

(57) ABSTRACT

A tailgate system for a vehicle includes a first door pivotable more than ninety degrees about a first door axis between a first door closed position and a first door fully-open position, and a second door pivotable more than ninety degrees about a second door axis between a second door closed position and a second door fully-open position. When the first door is in the first door closed position and the second door is in the second door closed position, the first door and the second door are pivotable together about a tailgate axis between a tailgate closed position and a tailgate open position relative to a cargo bed of a vehicle.

17 Claims, 6 Drawing Sheets

(56) References Cited

U.S. PATENT DOCUMENTS

| | | | | |
|---|---|---|---|---|
| 10,093,362 | B2 * | 10/2018 | Estrada | E05B 83/20 |
| 10,717,478 | B2 | 7/2020 | Dieckmann et al. | |
| 11,427,265 | B2 * | 8/2022 | Williamson | B62D 33/0273 |
| 11,584,451 | B2 * | 2/2023 | Gibbs | B62D 33/03 |
| 2007/0237614 | A1 * | 10/2007 | Johnson | B60P 1/431<br>414/467 |
| 2012/0324793 | A1 * | 12/2012 | Abbasi | B62D 33/0273<br>49/168 |
| 2016/0200260 | A1 * | 7/2016 | Faruque | B62D 33/027<br>296/37.6 |
| 2016/0236724 | A1 | 8/2016 | Borges Filho et al. | |
| 2016/0257238 | A1 * | 9/2016 | Ban | B65G 67/02 |
| 2018/0086392 | A1 * | 3/2018 | Seki | B62D 33/0276 |
| 2019/0185074 | A1 * | 6/2019 | Morley | E05B 85/243 |
| 2021/0078511 | A1 * | 3/2021 | Ledwith | B62D 33/0273 |
| 2021/0245818 | A1 * | 8/2021 | Van Norman | B62D 33/0273 |
| 2022/0161870 | A1 * | 5/2022 | Horner | B60Q 1/307 |
| 2022/0170301 | A1 * | 6/2022 | Lampsa | E05D 3/125 |
| 2022/0289312 | A1 * | 9/2022 | Aquila | B62D 25/105 |
| 2023/0046429 | A1 * | 2/2023 | Go | B60J 5/125 |
| 2025/0153782 | A1 * | 5/2025 | Salter | B60Q 3/30 |
| 2026/0042399 | A1 * | 2/2026 | Cho | B60R 3/02 |
| 2026/0042488 | A1 * | 2/2026 | Cho | B62D 33/0273 |
| 2026/0042489 | A1 * | 2/2026 | Cho | B62D 33/037 |
| 2026/0043287 | A1 * | 2/2026 | Cho | E05F 15/622 |

OTHER PUBLICATIONS

NPL: YouTube—Cereal Marshmallows—U Haul Truck rear taillights Jan. 20, 2015 https://www.youtube.com/watch?v=N9ahVchpJiM (Year: 2015).*

Canoo, A Purpose Built Pickup Truck, retrieved from https://www.canoo.com/pickup/ on Jan. 18, 2022, pp. 1-11.

Chevrolet, Multi-Flex Tailgate 2021 Chevy Silverado, New Roads Magazine, Apr. 21, 2021, retrieved from https://www.chevrolet.com/new-roads/trucks/silverado-multi-flex-tailgate on Jan. 18, 2022, pp. 1-6.

Ready Ramp, Ready Ramp Truck Bed Extender, retrieved from https://readyramp.com on Feb. 11, 2022, pp. 1-7.

* cited by examiner

TAILGATE SYSTEM AND TAILGATE OPERATING METHOD

TECHNICAL FIELD

This disclosure relates generally to a tailgate and, more particularly, to a tailgate having doors that can each pivot more than ninety degrees.

BACKGROUND

Many motor vehicles include cargo spaces for transporting various types of cargo. A pickup truck, for example, includes a cargo bed that establishes a cargo space. A tailgate typically encloses one end of the cargo bed. The tailgate can pivot between a closed position, which encloses an aft end of the cargo bed, and an open position.

SUMMARY

In some aspects, the techniques described herein relate to a tailgate system for a vehicle, including: a first door pivotable more than ninety degrees about a first door axis between a first door closed position and a first door fully-open position; and a second door pivotable more than ninety degrees about a second door axis between a second door closed position and a second door fully-open position, when the first door is in the first door closed position and the second door is in the second door closed position, the first door and the second door are pivotable together about a tailgate axis between a tailgate closed position and a tailgate open position relative to a cargo bed of a vehicle.

In some aspects, the techniques described herein relate to a tailgate system, further including a first cargo bed sidewall and a second cargo bed sidewall, the first door pivotable about the first door axis relative to the first cargo bed sidewall, the second door pivotable about the second door axis relative to the second cargo bed sidewall.

In some aspects, the techniques described herein relate to a tailgate system, further including at least one first door hinge pivotably coupling the first door to the first cargo bed sidewall, and at least one second door hinge pivotably coupling the second door to the second cargo bed sidewall.

In some aspects, the techniques described herein relate to a tailgate system, wherein the at least one first door hinge is at least one first two hundred seventy degree door hinge, wherein the at least one second door hinge is at least one second two hundred seventy degree door hinge.

In some aspects, the techniques described herein relate to a tailgate system, further including a first taillight assembly secured to the first cargo bed sidewall and a second taillight assembly secured to the second cargo bed sidewall, the first door spaced a distance outboard from the first cargo bed sidewall when the first door is in the first door fully-open position such that the first taillight assembly is not covered by the first door when viewed from a position aft the cargo bed of the vehicle, the first door spaced a distance outboard from the first cargo bed sidewall when the first door is in the first door fully-open position such that the first taillight assembly is not covered by the first door when viewed from a position aft the cargo bed of the vehicle.

In some aspects, the techniques described herein relate to a tailgate system, wherein the first door rotates two hundred seventy degrees about the first door axis when rotated from the first door closed position to the first door fully-open position, wherein the second door rotates two hundred seventy degrees about the second door axis when rotated from the second door closed position to the second door fully-open position.

In some aspects, the techniques described herein relate to a tailgate system, wherein the first door axis and the second door axis are vertically extending axes, wherein the tailgate axis is a horizontally extending axis.

In some aspects, the techniques described herein relate to a tailgate system, further including at least one tailgate latch that can transition between a latched position and a unlatched position, the at least one tailgate latch in the latched position securing the first door to the second door when the first door is in the first door closed position and the second door is in the second door closed position, the at least one tailgate latch in the unlatched position permitting pivoting of the first door about the first door axis and permitting pivoting of the second door about the second door axis.

In some aspects, the techniques described herein relate to a tailgate system, wherein the first door pivots about the first door axis between a first door closed position and a first door fully-open position.

In some aspects, the techniques described herein relate to a tailgate system, further including a first door sidewall latch engageable to hold the first door in the first door fully-open position.

In some aspects, the techniques described herein relate to a tailgate system, further including a first cargo bed sidewall, the first door sidewall latch latching the first door to the first cargo bed sidewall when the latch is engaged.

In some aspects, the techniques described herein relate to a tailgate system, further including a bumper assembly that blocks the first door from directly contacting the first cargo bed sidewall when the first door is in the first door fully-open position.

In some aspects, the techniques described herein relate to a tailgate system, further including a platform assembly that moves between a retracted position and an extended position relative to the cargo bed, the platform assembly providing an extension of the cargo bed when the platform assembly is in the extended position.

In some aspects, the techniques described herein relate to a tailgate system, further including a flip-up load stop of the platform assembly, the flip-up load stop pivotable to a load stop position when the platform assembly is in the extended position.

In some aspects, the techniques described herein relate to a tailgate system, further including a step of the platform assembly, the platform assembly pivotable between the extended position and a step position where the step can be used to access the cargo bed.

In some aspects, the techniques described herein relate to a tailgate system, wherein the first door is a sixty percent door, and the second door is a forty percent door.

In some aspects, the techniques described herein relate to a tailgate system, wherein the first door in the first door closed position interfaces with the second door in the second door closed position along a vertically extending interface.

In some aspects, the techniques described herein relate to a tailgate operating method, including: unlatching a first door of a tailgate from a latched position with a second door of the tailgate; and pivoting the first door more than ninety degrees from a first door closed position to a first door fully-open position about a first door axis, the pivoting relative to a first cargo bed sidewall.

In some aspects, the techniques described herein relate to a method, further including, when the first door is in the latched position with the second door, pivoting the first door and the second door together about a tailgate axis between a tailgate closed position and a tailgate open position.

In some aspects, the techniques described herein relate to a method, further including after the unlatching, pivoting the second door more than ninety degrees from a second door closed position to a second door fully-open position about a second door axis, the pivoting relative to a second cargo bed sidewall, wherein the first door axis and the second door axis are vertically extending axes, wherein the tailgate axis is a horizontally extending axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary tailgate systems incorporating tailgates that have doors. The doors of the tailgates can each pivot more than ninety degrees about respective vertically extending axes.

Figure 1:
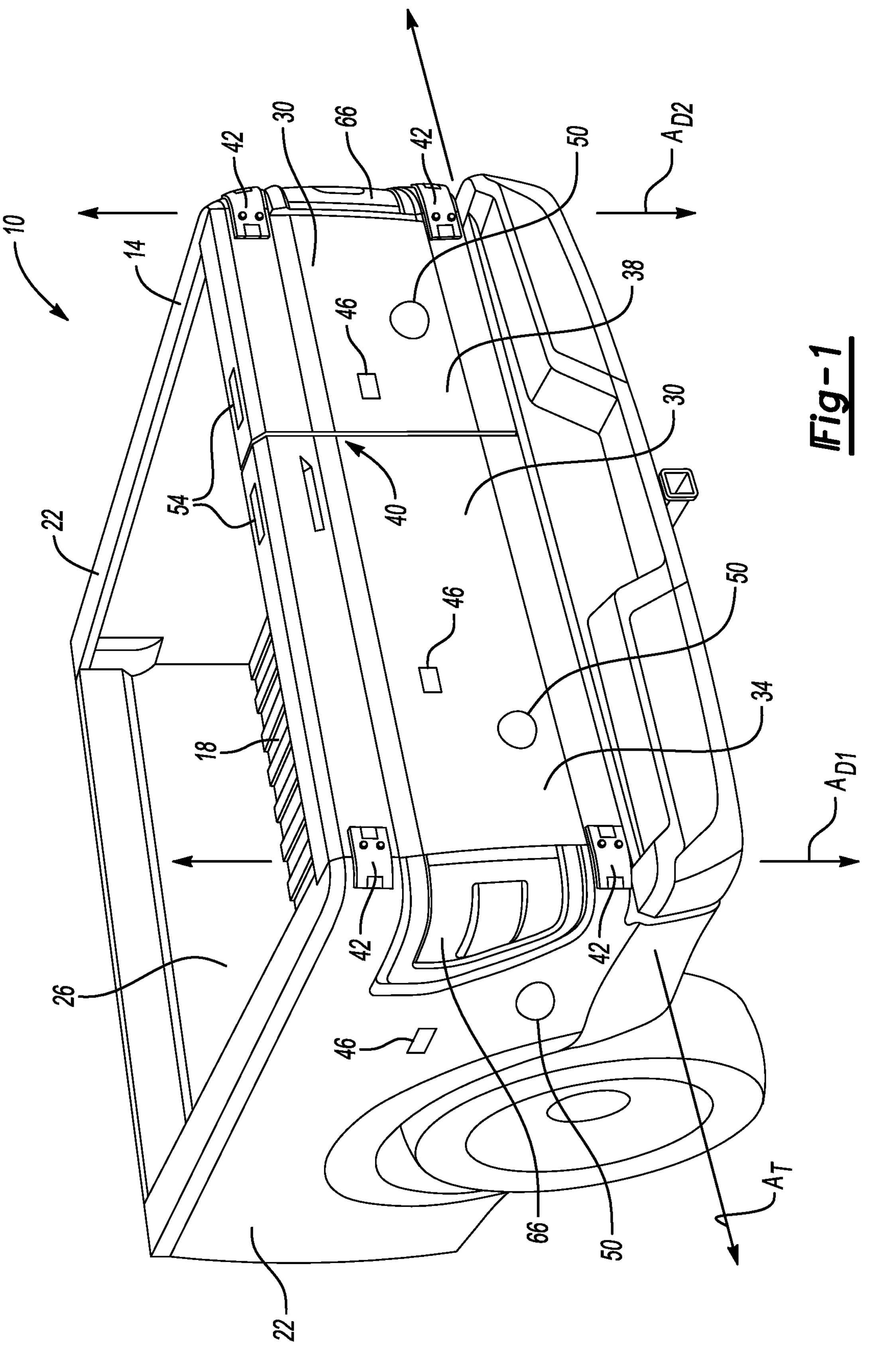
FIG. 1 is a rear perspective view of a motor vehicle equipped with a cargo bed and a tailgate assembly having doors.

With reference to FIG. 1 a vehicle 10 according to an exemplary aspect of the present disclosure includes a cargo bed 14 for storing cargo, hauling cargo, or both. The vehicle 10 could be a conventional, internal combustion engine powered vehicle, a traction battery powered electric or hybrid vehicle, an autonomous vehicle (i.e., a driverless vehicle), etc.

Although specific component relationships are illustrated in the figures of this disclosure, the illustrations are not intended to limit the disclosure. The placement and orientation of the various components of the vehicle are shown schematically and can vary within the scope of this disclosure. In addition, the various figures accompanying this disclosure are not necessarily drawn to scale, and some features may be exaggerated or minimized to emphasis certain details of a particular component.

In the exemplary embodiment, the vehicle 10 is a pickup truck. While a pickup truck with the cargo bed 14 is specifically depicted and referenced herein, other vehicles having other types of cargo spaces could benefit from the teachings of this disclosure.

The cargo bed 14 is generally rearward a passenger compartment (not shown) of the vehicle 10. The cargo bed 14 includes a floor 18 extending between a pair of longitudinally extending sidewalls 22, a laterally extending front wall 26, and a tailgate assembly 30. The overall size, shape, and configuration of the cargo bed 14 is not intended to limit this disclosure.

The tailgate assembly 30 includes a first door 34 and a second door 38. The first door 34 and the second door 38, when closed, meet at an interface 40.

In the exemplary embodiment, the first door 34 extends in a cross-vehicle direction across approximately sixty percent of a width of the cargo bed 14, and the second door 38 extends approximately across approximately forty percent of the width of the cargo bed 14. This tailgate assembly 30 can thus be considered a 60/40 split tailgate. In another example, the first door 34 could extend across fifty percent of the width the cargo bed 14 and the second door 38 across the remaining fifty percent of the width to provide a 50/50 split tailgate.

When the first door 34 and the second door 38 are in the closed position, the first door 34 can be latched to the second door 38 at the interface. When the first door 34 is in a closed position and latched to the second door 38 in the closed position, the first door 34 and the second door 38 are pivotable together about a tailgate axis $A_T$ between the tailgate closed position shown in FIG. 1 and a tailgate open position. The tailgate axis $A_T$ is a horizontally extending axis. Horizontal and vertical, for purposes of this disclosure, are with reference to ground and a general orientation of the vehicle during operation.

Figure 2A:
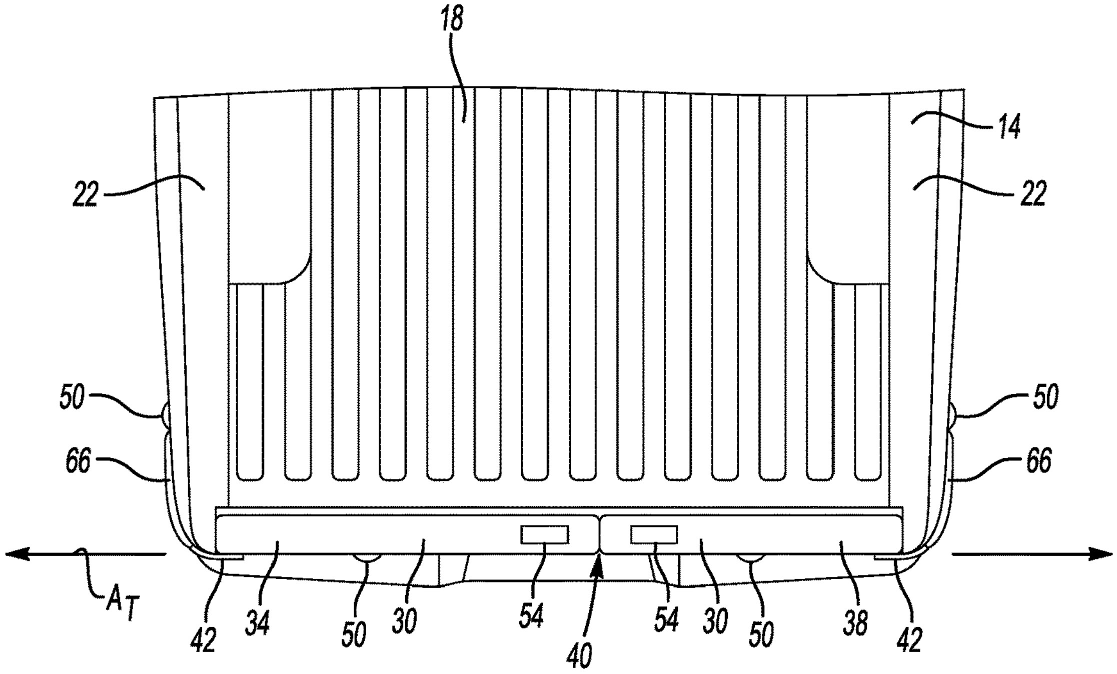
FIGS. 2A-2C illustrate top views of the cargo bed of FIG. 1 with doors of the tailgate assembly shown in closed positions, open positions, and fully-open positions.
Figure 2B:
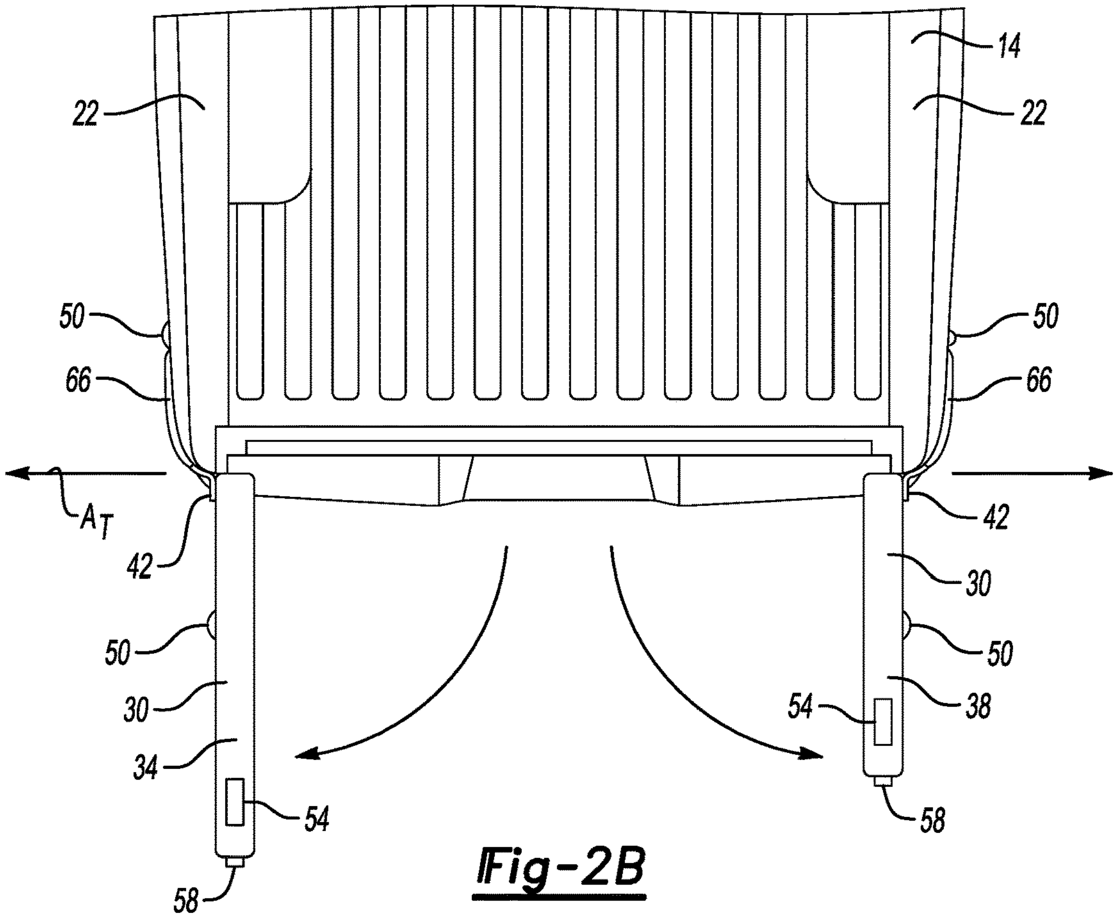
Figure 2C:
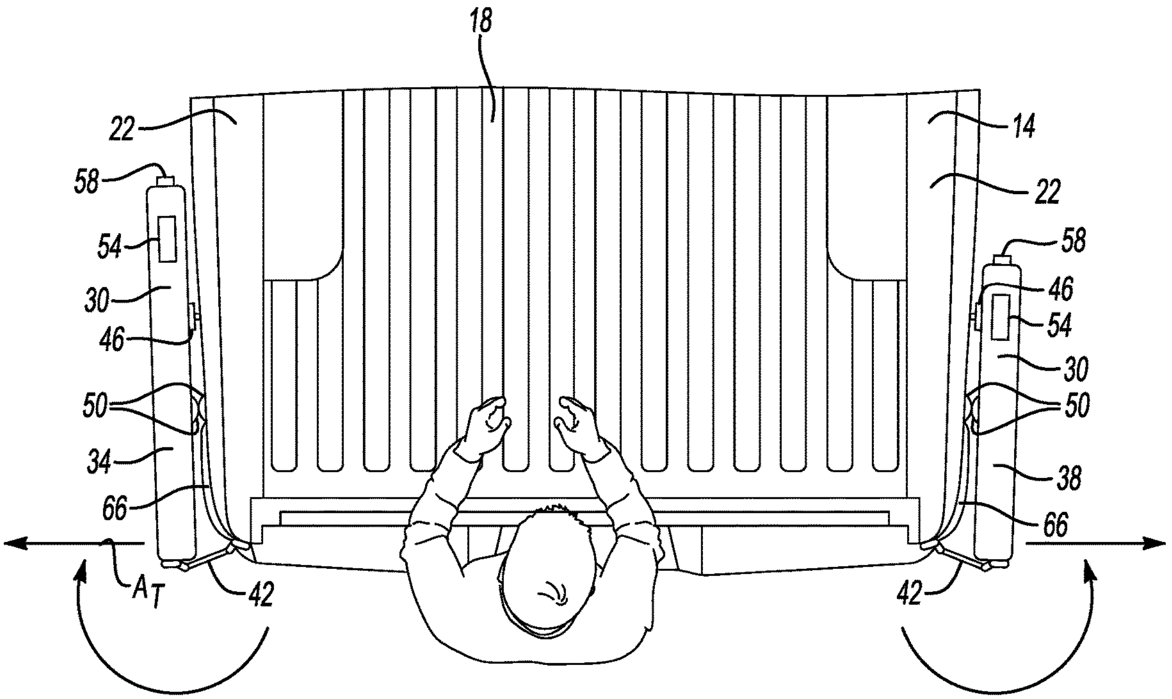

With reference now to FIGS. 2A-4 and continued reference to FIG. 1, the first door 34 is pivotable about a first door axis $A_{D1}$ between the first door closed position shown in FIG. 2A and a first door fully-open position shown in FIG. 2C. The second door 38 is similarly pivotable more than ninety degrees about a second door axis $A_{D1}$ between a second door closed position shown in FIG. 2A and a second door fully-open position shown in FIG. 2C. The first door axis $A_{D1}$ and the second door axis $A_{D2}$ are each vertically extending.

When the first door 34 is in the first door fully-open position and the second door is in the full-open position a user can access the cargo bed 14 while standing relatively close to the cargo bed 14.

A plurality of hinges 42 pivotably coupled the first door 34 and the second door 38 to the respective sidewalls 22. In this example, two hinges 42 pivotably secure the first door 34 to the sidewall 22 on the driver side of the vehicle 10, and two other hinges 42 pivotably secure the second door 38 to the sidewall 22 on the passenger side of the vehicle 10. The hinges are two hundred seventy degree hinges in this example. In this example, rotating the first door 34 and the second door 38 from the respective closed positions to the respective fully-open position involves rotating the first door 34 and the second door 38 two hundred seventy degrees.

In an example, the vertically upper hinge 42 in FIG. 1 that helps to pivotably couple the first door 34 to the sidewall 22 can be decoupled from the first door 34 to permit pivoting of the first door 34 with the second door 38 about the tailgate axis $A_T$. In another example, the vertically upper hinge 42 that helps to pivotably couple the first door 34 to the sidewall 22 can be decoupled from the sidewall 22 and pivot with the first door 34 and the second door 38 about the tailgate axis $A_T$. A latch mechanism can be used to selectively couple and decouple the vertically upper hinge 42 from the sidewall 22 or the first door 34 in this way. The vertically upper hinge 42 that helps to pivotably couple the second door 38 to the sidewall 22 can be configured similarly with a latch to permit decoupling of the hinge 42 from the second door 38 or the sidewall 22 thereby allowing the second door 38 to pivot with the first door 34 about the tailgate axis $A_T$.

The vertically lower hinges 42 pivotably couple the first door 34 and the second door 38 to the sidewalls 22 through hinge pivot rods in this example. The hinge pivot rods of these vertically lower hinges 42 can permit the first door 34 and the second door 38 to individually pivot about the respective first door axis $A_{D2}$ and second door axis $A_{D2}$. The pivot rods can also permit pivoting of the first door 34 and the second door 38 together about the tailgate axis $A_T$.

The first door 34 pivots about the first door axis $A_{D1}$ relative to the sidewall 22 on the driver side of the vehicle 10. The second door 38 pivots about the second door axis Ape relative to the sidewall 22 on the passenger side of the vehicle 10. In the fully-open positions, respective sidewall latch assemblies 46 can be engaged to hold the first door 34 and the second door 38 to the respective sidewalls 22 in the fully-open position. The sidewall latch assemblies 46 can include strikers on the first door 34 and the second door 38, and latches on the sidewalls 14. The latches could be covered with a flap that pivots when contact by the striker.

Bumpers 50 can be included on the sidewalls 22, the first door 34, and the second door 38 to, among other things, protect surfaces of the first door 34, the second door 38, and the sidewalls 22. The bumpers 50 can block the first door 34 and the second door 38 from directly contacting the respective sidewalls 22 when in fully-open positions.

The first door 34 and the second door 38 pivot relative to the respective sidewalls 22 independently from each other. That is, the first door 34 can be pivoted about the first door axis $A_{D1}$ while the second door 38 remains in the closed position.

The first door 34, in this example, includes a handle 54 used to actuate a tailgate latch assembly 58 that engages to secure the first door 34 in the closed position. The tailgate latch assembly 58 can be latched to secure the first door 34 in a latched position to the second door 38, to another portion of the cargo bed 14, or both. The first door 34 is latched to the second door 38 in a latched position when the first door 34 and the second door 38 are pivoted together about the tailgate axis $A_T$.

The handle 54 can be actuated to unlatch the tailgate latch assembly 58 to permit pivoting movement of the first door 34 about the first door axis $A_{D1}$. Similarly, the second door 38 can include a handle 54 that can be actuated to unlatch a tailgate latch assembly 58 and permit pivoting movement of the second door 38 about the second door axis $A_{D2}$.

Figure 3:
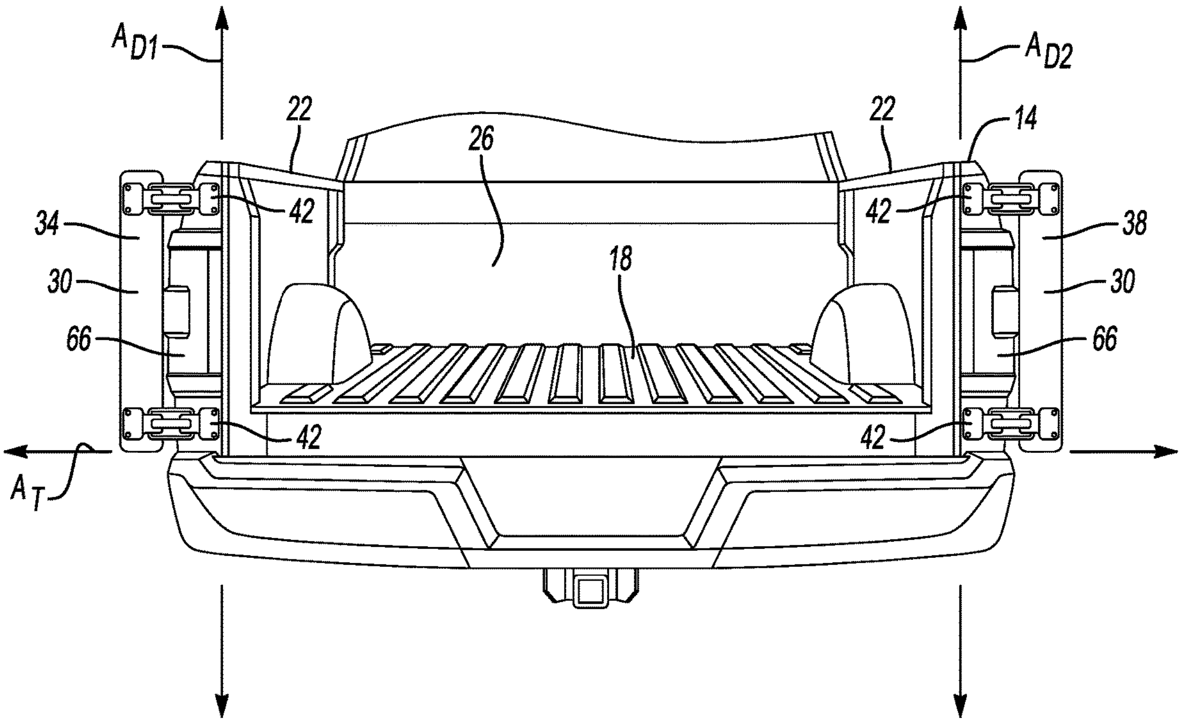
FIG. 3 illustrates a rear view of the motor vehicle of FIG. 1 with doors of the tailgate assembly in fully-open positions.

Notably, as shown in FIG. 3, when the first door 34 and the second door 38 are in the fully-open position, taillights 66 at the aft ends of the sidewalls 22 are visible from a positions aft the cargo bed 14. The taillights 66 are visible through gaps between the first door 34, the second door 38 and the respective sidewalls 22.

When the first door 34 is in the fully-open position, the first door 34 is spaced outward from the sidewall 22 on the driver side so that the first door 34 does not conceal the taillight 66 on the driver side. Similarly, when the second door 38 is in the fully-open position, the second door 38 is spaced outward from the sidewall 22 on the passenger side so that the taillight 66 on the passenger side can be viewed from behind the cargo bed 14 when the second door 38 is in the fully-open position.

Figure 4:
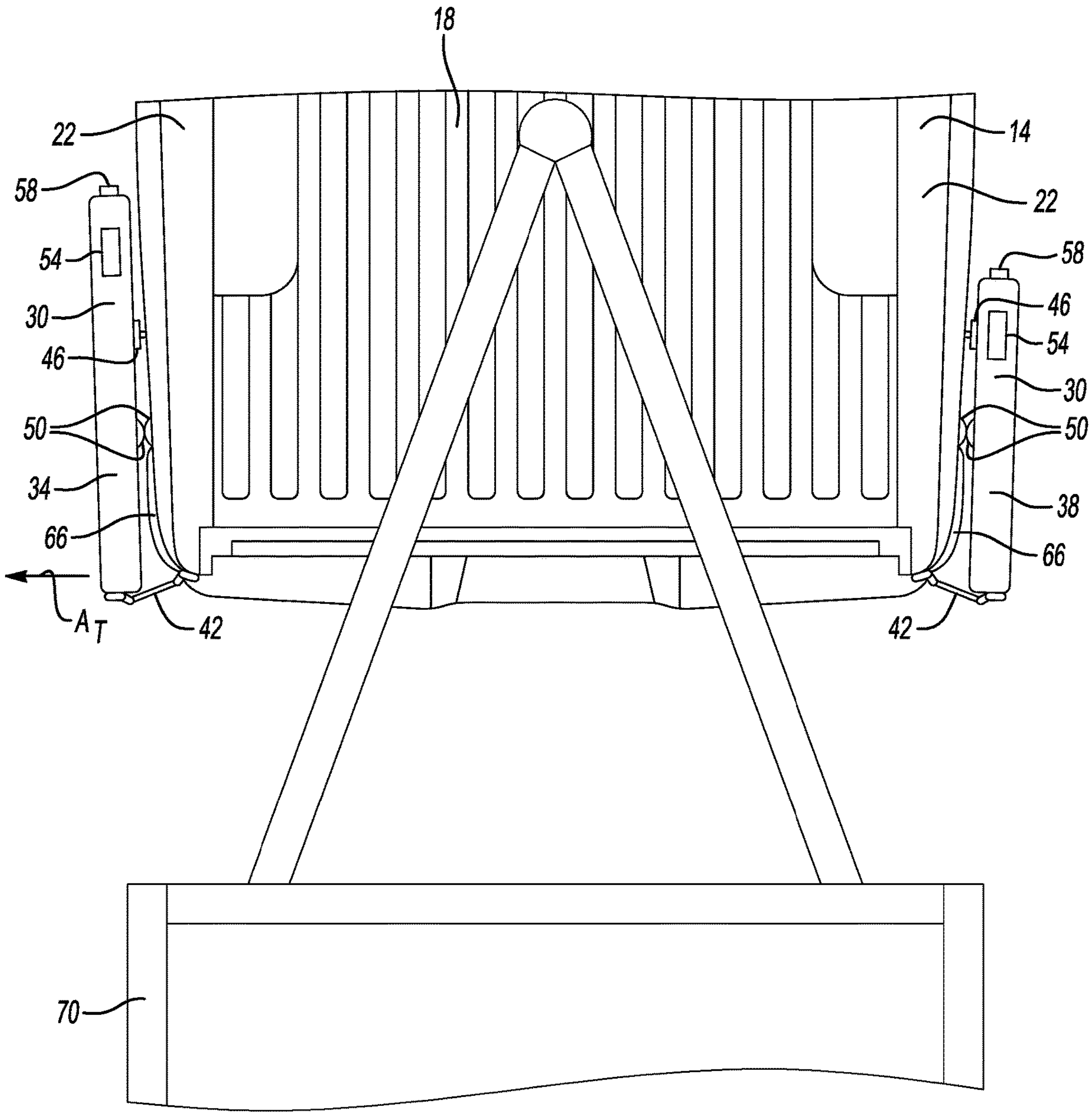
FIG. 4 illustrates another top view of the cargo bed of FIG. 1 when towing a fifth wheel trailer when the doors of the tailgate assembly are in fully-open positions.

As shown in FIG. 4, ensuring the taillights 66 are at least partially visible when the first door 34 and the second door 38 are in the fully-open position can be beneficial when the vehicle 10 is used to, for example, haul a trailer 70. An individual aft of the trailer 70 can receive visual indications from the taillights 66 in addition to any lights on the trailer 70. The first door 34 and the second door 38 in the fully open position provide adequate clearance for securing the trailer 70 and operating the vehicle 10 with the trailer 70.

Figure 5:
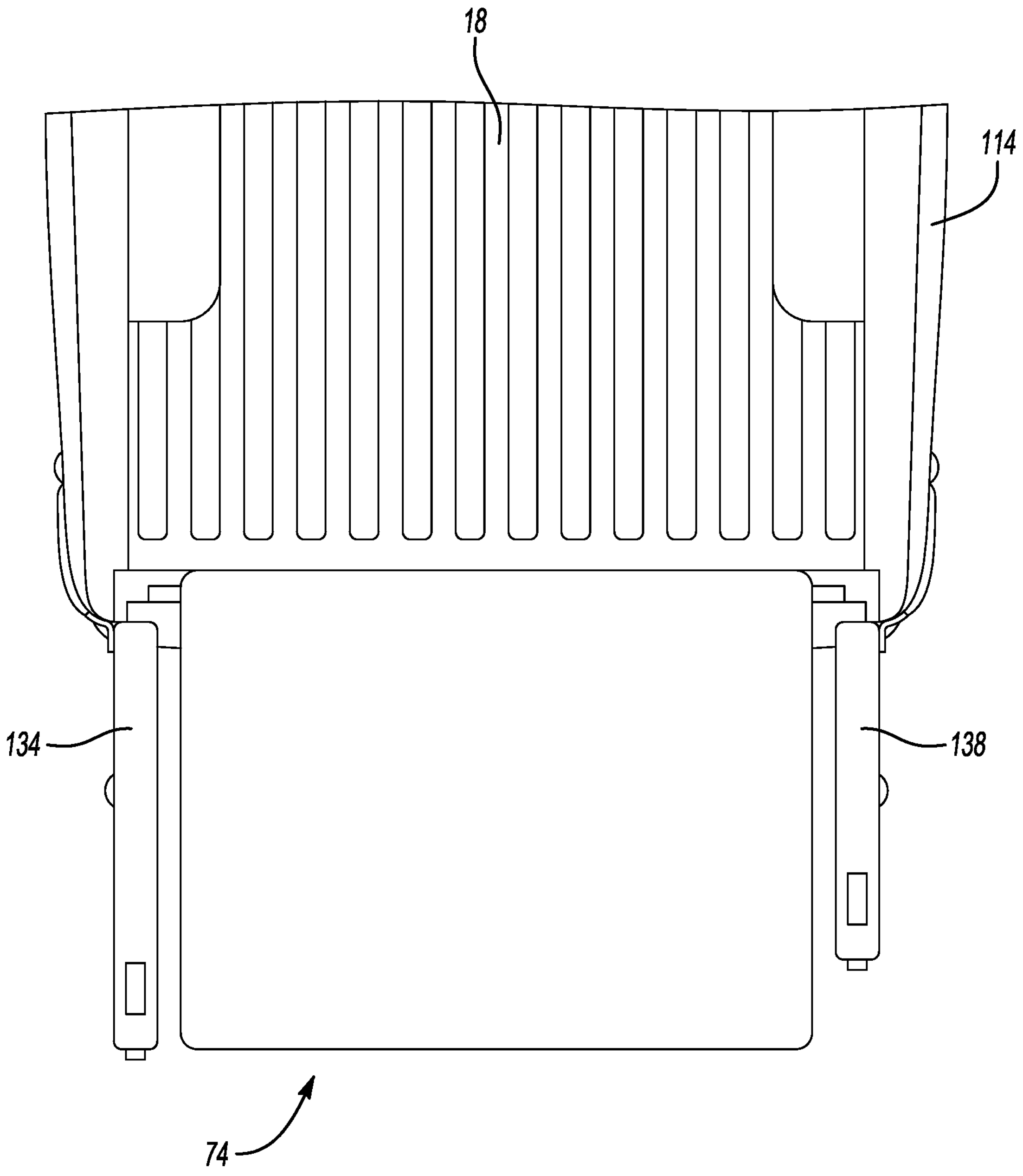
FIG. 5 illustrates a top view of a cargo bed of a vehicle according to another exemplary embodiment with a slide-out bed-extending platform assembly.
Figure 6:
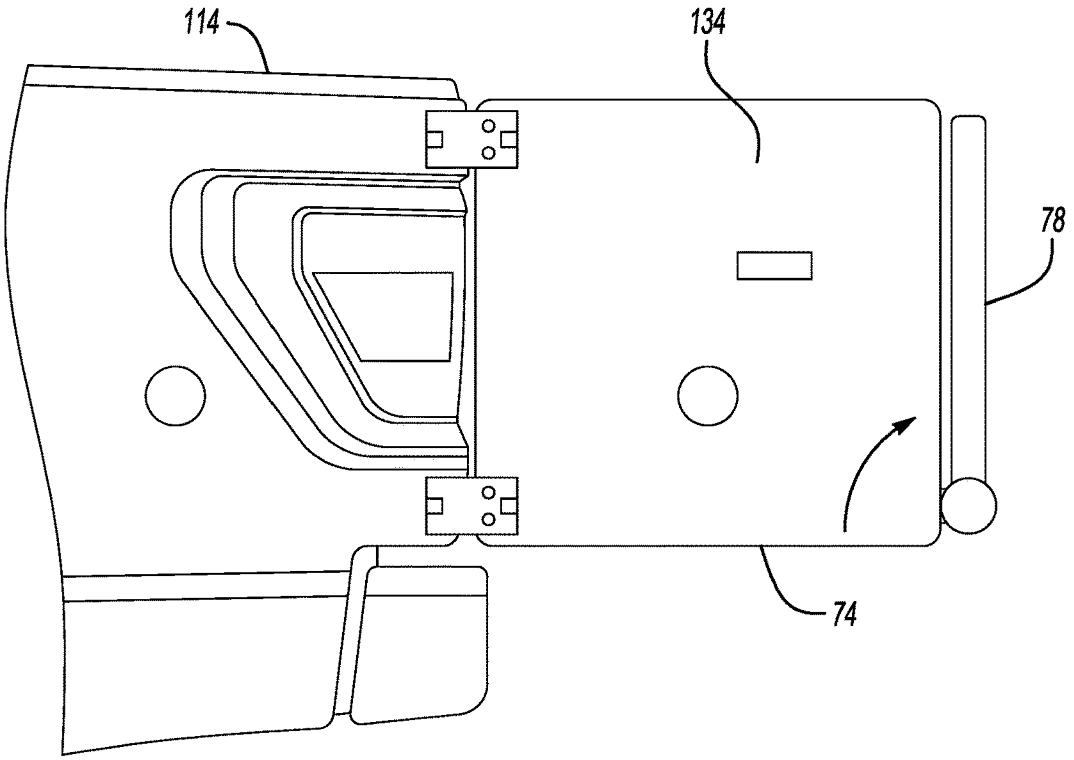
FIG. 6 illustrates a side view of the vehicle of FIG. 5 with the platform assembly in an extended position and a flip-up load stop of the platform assembly in a load stop position.

With reference now to FIGS. 5 and 6, a cargo bed 114 according to another exemplary embodiment includes a platform assembly 74 that is movable between a retracted position beneath the floor 18 of the cargo bed 114 and the extended position shown in FIG. 5. The platform assembly 74 can provide an effective extension of the cargo bed 114 when in the extended position. The exemplary platform assembly 74 is equipped with a flip-up load stop 78 that, as shown in FIG. 6, can be pivoted to a load stop position when the platform assembly 74 is in the extended position. The load stop 78 in the load stop position can help to secure cargo within the cargo bed 114.

A first door 134 and a second door 138 can together provide a 50/50 split tailgate. The first door 134 and the second door 138 can pivot more than ninety degrees, but can be pivoted approximately ninety degrees from closed positions to substantially provide sidewalls for the platform assembly 74 when the platform assembly 74 is in the extended position.

Figure 7:
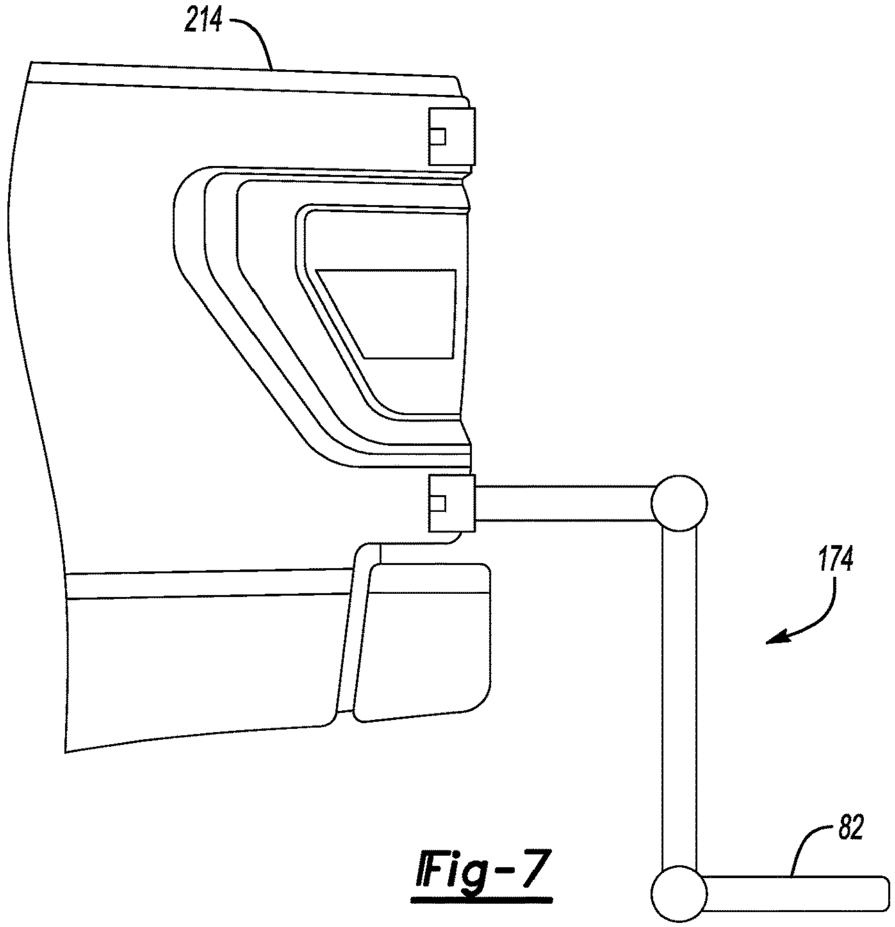
FIG. 7 illustrates an extendable platform of a vehicle according to another exemplary embodiment with a platform assembly including a step and rotated to a step position.

In another exemplary aspect of the present disclosure, as shown in FIG. 7, a platform assembly 174 can be movable between a retracted position beneath the floor of a cargo bed 214 and a deployed position shown in FIG. 7. The platform assembly 174 includes a step 82 instead of, or in addition to, a load stop. The platform assembly 174 can be rotated down as shown in FIG. 7 to present the step 82 in a stepping position where a user can use the step to assist with entering or exiting the cargo bed 214.

In other variations, the platform assembly 74 or 174 could be extended and rotated to contact the ground and provide a ramp to the cargo bed 114 or 214. The ramp could also be stowed beneath the floor of the cargo bed instead of the platform assembly 74 or 174.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A tailgate system for a vehicle, comprising:
- a first door pivotable more than ninety degrees about a first door axis between a first door closed position and a first door fully-open position;
- a first door sidewall latch engageable to hold the first door in the first door fully-open position; and
- a second door pivotable more than ninety degrees about a second door axis between a second door closed position and a second door fully-open position, when the first door is in the first door closed position and the second door is in the second door closed position, the first door and the second door are pivotable together about a tailgate axis between a tailgate closed position and a tailgate open position relative to a cargo bed of the vehicle.

2. The tailgate system of claim 1, further comprising a first cargo bed sidewall and a second cargo bed sidewall, the first door pivotable about the first door axis relative to the first cargo bed sidewall, the second door pivotable about the second door axis relative to the second cargo bed sidewall.

3. The tailgate system of claim 2, further comprising at least one first door hinge pivotably coupling the first door to the first cargo bed sidewall, and at least one second door hinge pivotably coupling the second door to the second cargo bed sidewall.

4. The tailgate system of claim 3, wherein the at least one first door hinge is at least one first two hundred seventy degree door hinge, wherein the at least one second door hinge is at least one second two hundred seventy degree door hinge.

5. A tailgate system for a vehicle, comprising:

a first door pivotable more than ninety degrees about a first door axis between a first door closed position and a first door fully-open position;

a second door pivotable more than ninety degrees about a second door axis between a second door closed position and a second door fully-open position, when the first door is in the first door closed position and the second door is in the second door closed position, the first door and the second door are pivotable together about a tailgate axis between a tailgate closed position and a tailgate open position relative to a cargo bed of the vehicle;

a first cargo bed sidewall and a second cargo bed sidewall, the first door pivotable about the first door axis relative to the first cargo bed sidewall, the second door pivotable about the second door axis relative to the second cargo bed sidewall;

at least one first door hinge pivotably coupling the first door to the first cargo bed sidewall, and at least one second door hinge pivotably coupling the second door to the second cargo bed sidewall; and a first taillight assembly secured to the first cargo bed sidewall and a second taillight assembly secured to the second cargo bed sidewall, the first door spaced a distance outboard from the first cargo bed sidewall when the first door is in the first door fully-open position such that the first taillight assembly is not covered by the first door when viewed from a position aft the cargo bed of the vehicle.

6. The tailgate system of claim 1, wherein the first door rotates two hundred seventy degrees about the first door axis when rotated from the first door closed position to the first door fully-open position, wherein the second door rotates two hundred seventy degrees about the second door axis when rotated from the second door closed position to the second door fully-open position.

7. The tailgate system of claim 1, wherein the first door axis and the second door axis are vertically extending axes, wherein the tailgate axis is a horizontally extending axis.

8. The tailgate system of claim 1, further comprising at least one tailgate latch that can transition between a latched position and a unlatched position, the at least one tailgate latch in the latched position securing the first door to the second door when the first door is in the first door closed position and the second door is in the second door closed position, the at least one tailgate latch in the unlatched position permitting pivoting of the first door about the first door axis and permitting pivoting of the second door about the second door axis.

9. The tailgate system of claim 1, further comprising a first cargo bed sidewall, the first door sidewall latch latching the first door to the first cargo bed sidewall when the first door sidewall latch is engaged.

10. The tailgate system of claim 9, further comprising a bumper assembly that blocks the first door from directly contacting the first cargo bed sidewall when the first door is in the first door fully-open position.

11. The tailgate system of claim 1, further comprising a platform assembly that moves between a retracted position and an extended position relative to the cargo bed, the platform assembly providing an extension of the cargo bed when the platform assembly is in the extended position.

12. The tailgate system of claim 11, further comprising a flip-up load stop of the platform assembly, the flip-up load stop pivotable to a load stop position when the platform assembly is in the extended position.

13. The tailgate system of claim 11, further comprising a step of the platform assembly, the platform assembly pivotable between the extended position and a step position where the step can be used to access the cargo bed.

14. The tailgate system of claim 1, wherein the first door is a sixty percent door, and the second door is a forty percent door.

15. The tailgate system of claim 1, wherein the first door in the first door closed position interfaces with the second door in the second door closed position along a vertically extending interface.

16. A tailgate operating method, comprising:

unlatching a first door of a tailgate from a latched position with a second door of the tailgate, the first door and the second door configured to pivot together about a tailgate axis between a tailgate closed position and a tailgate open position when the first door is in the latched position with the second door;

pivoting the first door more than ninety degrees from a first door closed position to a first door fully-open position about a first door axis, the pivoting relative to a first cargo bed sidewall; and latching the first door to the first cargo bed sidewall to hold the first door in the first door fully-open position.

17. The tailgate operating method of claim 16, further comprising after the unlatching, pivoting the second door more than ninety degrees from a second door closed position to a second door fully-open position about a second door axis, the pivoting relative to a second cargo bed sidewall, wherein the first door axis and the second door axis are vertically extending axes, wherein the tailgate axis is a horizontally extending axis.

* * * * *